United States Patent [19]
> Ryan

[11] Patent Number: 4,907,093
[45] Date of Patent: Mar. 6, 1990

[54] METHOD AND APPARATUS FOR PREVENTING THE COPYING OF A VIDEO PROGRAM

[75] Inventor: John O. Ryan, Cupertino, Calif.

[73] Assignee: Macrovision Corporation, Mountain View, Calif.

[21] Appl. No.: 264,316

[22] Filed: Nov. 1, 1988

Related U.S. Application Data

[63] Continuation of Ser. No. 895,045, Aug. 11, 1986, abandoned.

[51] Int. Cl.$^4$ .............................................. H04N 5/76
[52] U.S. Cl. .................................... 358/335; 358/319; 360/37.1; 380/5; 380/10; 380/15
[58] Field of Search ....................... 358/148, 319, 335; 360/15, 33.1, 37.1, 60; 380/5, 10, 15, 7

[56] References Cited

U.S. PATENT DOCUMENTS 4,475,129 10/1984 Kagota ........................... 358/319 X
4,488,183 12/1984 Kinjo ................................ 358/319

Primary Examiner—Robert L. Richardson
Attorney, Agent, or Firm—Flehr, Hohbach, Test, Albritton & Herbert

[57] ABSTRACT

A video signal is modified so that a television receiver will still provide a normal color picture but which a video tape recorder will detect and prohibit its being recorded. A plurality of ordered pairs of pseudo-sync and positive pulses are added to the video signal vertical blanking interval following the normal sync pulse. A disabling circuit associated with a recorder detects the modified signal. This detection may be by comparing the voltage differential between the pseudo-sync pulse tip and the positive pulse relative to the normal voltage differential between the sync pulse tip and the back porch of the blanking interval. Alternatively, the modified signal can be detected by identifying the pulse frequency of the signal in the blanking interval. A high frequency is indicative of the presence of the modified signal. Detection is also shown by peak-detecting the video signal and sampling this peak-detected signal during the vertical blanking period. A control signal is produced, when the modified signal is present, which disables the recording device. If no modified signal is detected, the recording device is enabled.

52 Claims, 2 Drawing Sheets

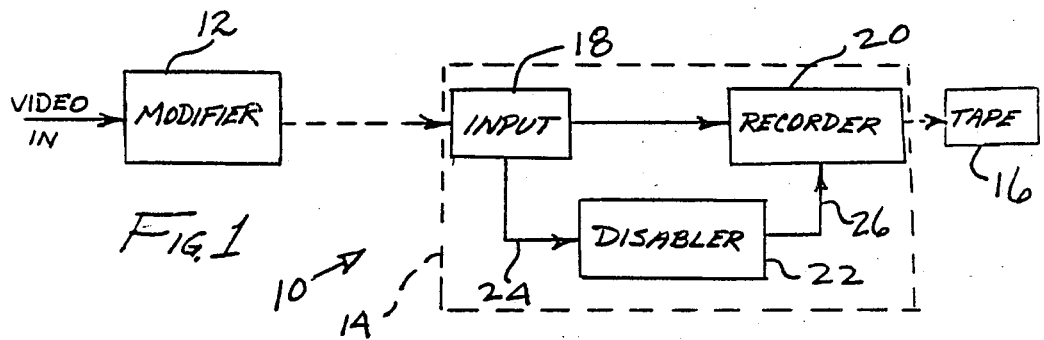
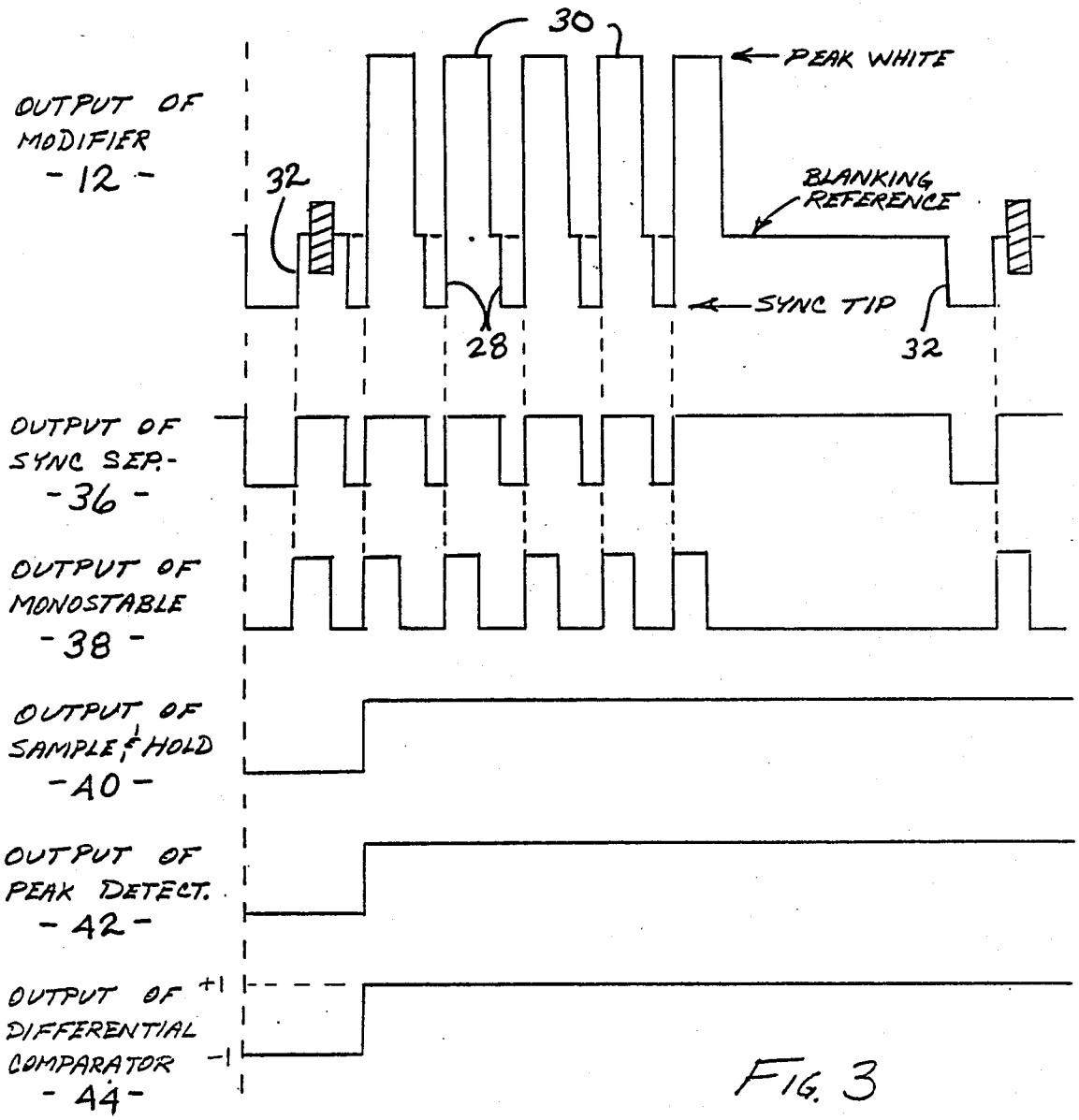
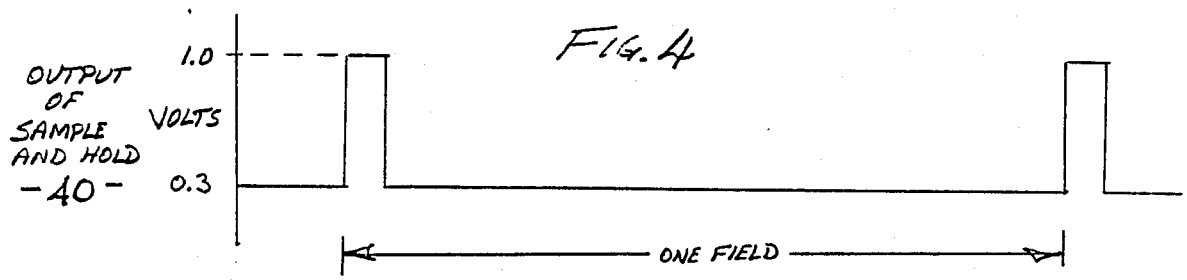

METHOD AND APPARATUS FOR PREVENTING THE COPYING OF A VIDEO PROGRAM

This is a continuation of application Ser. No. 895,045, filed Aug. 11, 1986, and now abandoned.

BACKGROUND OF THE INVENTION

This invention relates to a method and apparatus for preventing the copying of a video program. More particularly, it relates to modifying a video signal in a manner detectable by a video recorder apparatus and disabling the recording device when the modified video signal is detected.

Various apparatus and methods have been developed for modifying a video signal so that a normal color picture may be produced by a television receiver receiving the modified video signal, but that video recording of the modified video signal is impaired. That is, a video picture produced from the video signal as recorded on a video tape recorder is altered so that it makes unacceptable viewing.

U.S. patent application Ser. No. 724,006, filed in the U.S. Patent and Trademark Office on Apr. 17, 1985 and entitled "Method and Apparatus for Processing a Video Signal so as to Prohibit the Making of Acceptable Video Tape Recordings Thereof" (now U.S. Pat. No. 4,631,603), which is incorporated herein by reference, discloses such a method and apparatus. It describes adding ordered pairs of pseudo-sync pulses and white pulses during the vertical blanking interval. These pulse pairs act in concert to confuse the automatic gain control system of a video cassette recorder (VCR), leading to generally unviewable pictures.

As VCR's become more sophisticated, such as including dubbing (integrated playback and recording) systems, the likelihood of copying video tapes increases. Present systems do not prevent the copying of video tapes, but rather produce modified video tape signals which, when recorded by a VCR and played back, produce impaired pictures It is desirable to prevent the taping of video signals altogether.

SUMMARY OF THE INVENTION

The present invention provides an apparatus and method for preventing the recording of selected video signals. More particularly, the present invention provides for detecting a modified video signal at a recording device, and disabling the recording device when the modified signal is detected. Unmodified signals correspondingly result in the recording device being enabled, so that the video signal may be recorded. Thus, when video tapes are originally recorded with a recognizable, copy-protecting modified waveform, the tape recording device can be completely disabled so that it cannot record the video signal at all.

These and other features and advantages of the present invention will be more clearly understood from a consideration of the drawings and the following detailed description of the preferred embodiments.

BRIEF DESCRIPTION OF THE DRAWINGS

FIG. 1 is a simplified block diagram of a system made according to the present invention;

FIG. 3 is an illustration of waveforms present at selected points in the exemplary embodiment of FIG. 2;

FIG. 4 is an illustration of one of the waveforms shown in FIG. 3 with an extended time scale.

DETAILED DESCRIPTION OF THE PREFERRED EMBODIMENTS

Figure 2:
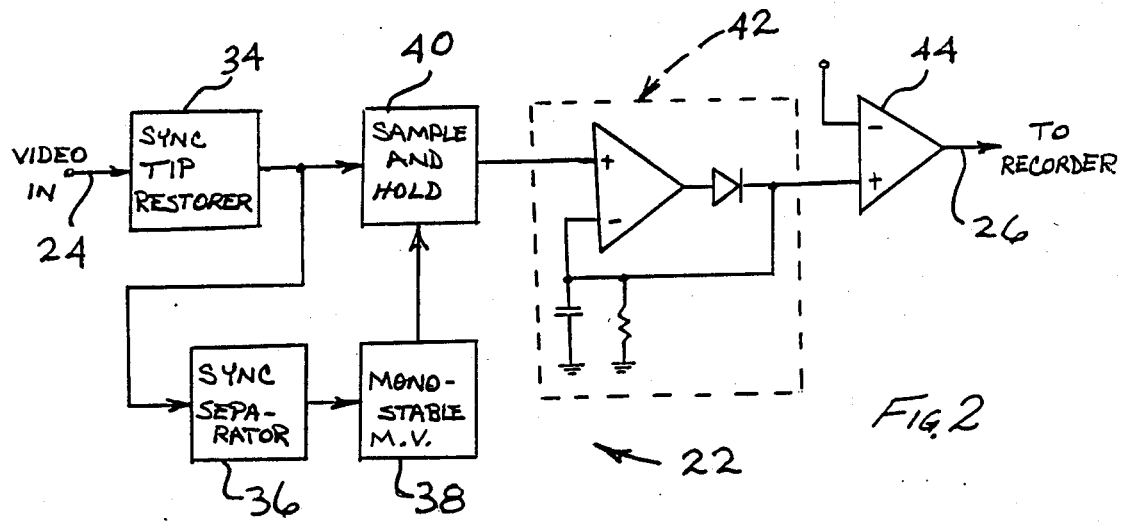
FIG. 2 is a more detailed block diagram of a recording disabling apparatus usable in the system of FIG. 1.

Referring initially to FIG. 1, a system for preventing the copying of a video program in accordance with the present invention is shown generally at 10. Initially, a conventional video signal is input to a video signal modifier 12. Modifier 12 is preferably the apparatus described in previously referenced U.S. Pat. No. 4,631,603. The modifier adds a selected waveform to a conventional video signal which it is desired not be copied. The modified video signal is conveyed to a video tape recorder or more commonly, a video cassette recorder (VCR) 14 for recording on a magnetic tape 16 or other suitable recording medium. The video signal may be conveyed from modifier 12 by recording the modified signal on a video tape, such as a video cassette, which is played into VCR 14. Alternatively, it may be broadcast over a cable or other broadcast system and received at a tuner in the VCR.

Conventional video cassette recorders include an input 18 which may include a tuner, for receiving input video signals and a recording device 20 coupled to input 18 for recording the received video signal on tape 16. In the VCR of the present invention, what is referred to as a disabler 22 is also included. Disabler 22 receives the video signal from input 18 on a lead 24, detects whether the video signal is a modified signal and outputs a corresponding control signal on a lead 26 coupled to recording device 20. The recording device is prohibited from recording when the modified video signal is detected. Otherwise, a signal is output on lead 26 which enables recorder 20 to record the video signal.

FIG. 2 illustrates a preferred embodiment of disabler 22. However, before describing the embodiment shown in FIG. 2, it is important to understand the form of the modified video signal detected by the preferred embodiment of disabler 22. This copy-protecting signal, as has been mentioned, is one which is produced by the apparatus described in U.S. Pat. No. 4,631,603. That system adds a plurality of ordered pairs of what are referred to as pseudo-sync pulses and white pulses to selected lines of the vertical blanking interval after the normal sync pulses. The top waveform of FIG. 3 illustrates a modified video signal having a set of five ordered pairs of pseudo-sync pulses 28 and white pulses 30 added to a line of the vertical blanking interval after a normal sync pulse 32. Generally, it is preferred that seven or more lines are modified to provide a total of about 35 or more pulse pairs per field. The pseudo-sync pulses 28 are so named because they extend from the blanking reference level to the sync tip level as do the normal sync pulses 32. They preferably have a duration of about two microseconds and are immediately followed by the white pulses 30, so named because they typically reach peak white level or beyond. The white pulses have a duration of about four microseconds.

There is thus provided a waveform which is different than the conventional vertical blanking interval. It is distinctive, both as to the voltage differential between the sync tip and the peak white level as well as the frequency of the pulses. It will be appreciated that variations can be made in these waveforms or that other identifiable waveforms may be used.

Referring to FIG. 2, the input video signal on lead 24 is input to a sync tip restorer 34 which clamps the sync tips to a reference level, preferably 0 volts. The output of the sync tip restorer has the same waveform as does the output of modifier 12. The output waveform of the various circuits shown in FIG. 2 are illustrated in FIG. 3. The output of restorer 34 is connected to a sync separator 36 which produces an output of sync pulses. These sync pulses are fed to a monostable multivibrator 38. The multivibrator is triggered by the trailing edges of the input sync pulses to generate nominally three microsecond sampling pulses. These pulses activate a sample and hold circuit 40 which receives the output of sync tip restorer 34. Thus, sample and hold circuit 40 generates an output which represents the voltage level of the back porches of the modified video signal and holds it until the next sample. The resultant output of sample and hold circuit 40 is shown more clearly in FIG. 4 which shows it having a level of 0.3 volts during normal video horizontal lines and a level of 1 volt for those lines in the vertical blanking interval having the modified signal.

The output of sample and hold circuit 40 is applied to the positive input of a positive peak detector 42 which holds its most positive value for the duration of several fields. This assures that the output will have a value throughout the receipt of the modified video signal so that no part of the video signal can be recorded. The output of peak detector 42 is thus a constant voltage of about +0.3 volts in the case of a normal video signal and about +1.0 volt in the case of a copy-protecting modified video signal in the embodiment illustrated herein.

The output of detector 42 is joined to the positive input of a differential comparator 44. The negative input of comparator 44 is preferably connected to a positive 0.5 volt reference voltage source. Comparator 44 thereby produces an output on lead 26 having a logic level which is high in the case of a modified or copy-protected video signal and low in the case of a normal video signal. As described previously with reference to FIG. 1, the logic signal at the output of comparator 6 is coupled to the record enable system of the VCR in such a manner as to prohibit or disable recording when in the high state, and enable recording when in the low state. In its simplest form, such an enable system is in the form of a switch connected in line with the recording device.

Each of the circuit blocks of FIGS. 1 and 2 other than the modifier, which is described in U.S. Pat. No. 4,631,603, are well known to persons of ordinary skill in the art and do not form an aspect of the present invention other than in combination with the other circuits as described. They are therefore not discussed in further detail.

Figure 5:
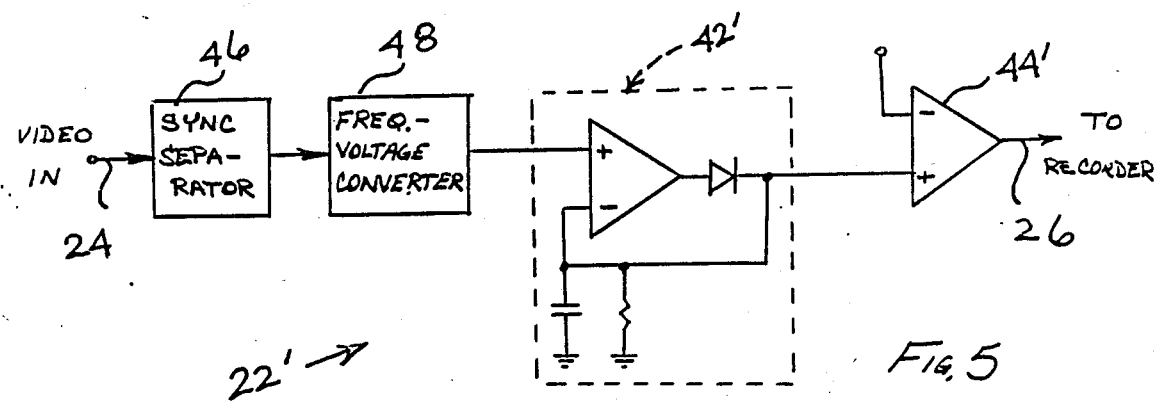
FIGS. 5 and 6 are block diagrams of alternative embodiments of the recording disabling apparatus of FIG. 2.

Referring now to FIG. 5, an alternative embodiment of disabler 22, shown as 22', is illustrated. The method of this embodiment relies on detecting the presence of the tightly grouped pseudo-sync pulses. Thus, although it is operable on the modified video signal waveform shown in FIG. 3, it will be appreciated that the white pulses are not utilized specifically, and therefore could be deleted. In such case, the wave form would look similar to the one labelled "output of sync sep. 36" in FIG. 3. Further, other forms of waveform could be used which also produce a frequency distinguishable from the frequency of normal sync pulses.

In particular, the video signal received on lead 24 is input to a sync separator 46 which produces an output similar to that of sync separator 36. The resulting series of pulses is input to a frequency-to-voltage convertor 48. Convertor 48 generates an output voltage proportional to the frequency of its input pulses. The output of convertor 48 will thus have the general characteristics of the waveform of FIG. 4 in that it will be most positive during the vertical interval region corresponding to the increased sync frequency. The output of convertor 48 is coupled to a positive peak detector 42' and differential comparator 44' in the same arrangement as peak detector 42 and comparator 44 of FIG. 2. This gives rise to the same logic level indication of the presence or absence of the modified or copy-protected video signal as was discussed with reference to the embodiment of FIG. 2.

Figure 6:
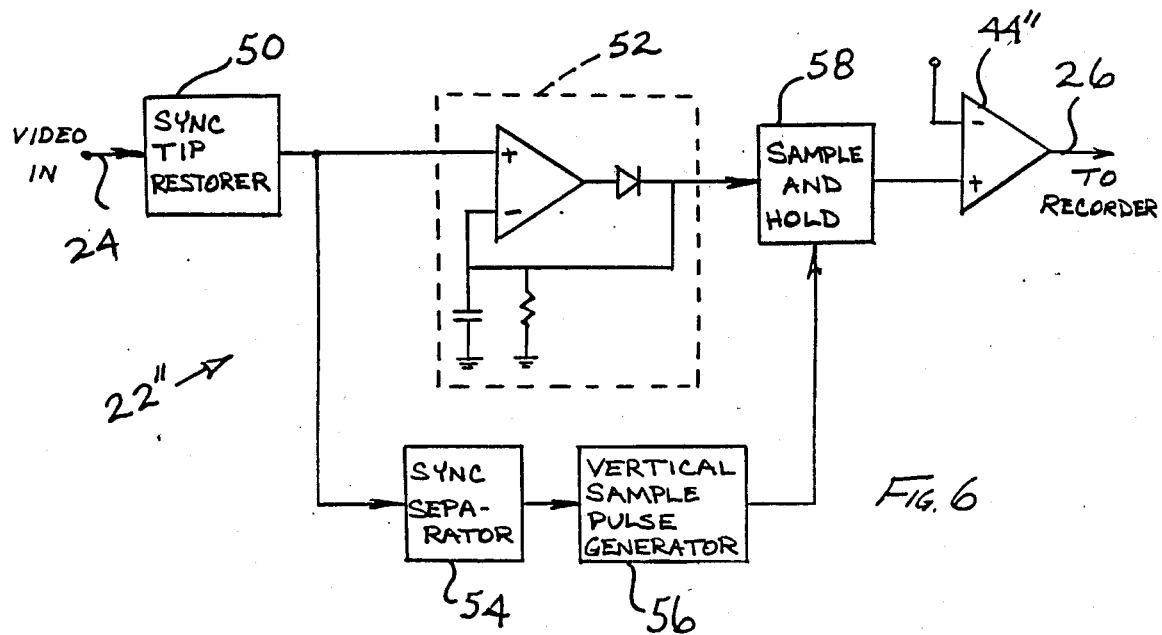

FIG. 6 shows yet a third exemplary embodiment of a disabler, shown as 22". Disabler 22" functions similar to disabler 22 in that it detects the presence of the white pulses by peak-detecting the video signal and sampling this peak-detected signal during the vertical blanking interval.

Specifically, the video signal is input from lead 24 to a sync tip restorer 50, the output of which is applied to a positive peak detector 52 having a fast charge time constant (less than 1 microsecond) and a long discharge time (about 100 microseconds). The output of sync tip restorer 50 is also connected to a sync separator 54 for generating an output waveform similar to that of sync separator 36 described with reference to FIGS. 2 and 3. The output of separator 54 is coupled to a vertical sample pulse generator 56. Generator 56 produces a series of sampling pulses for activating a sample and hold circuit 58. Circuit 58 receives as input the output of peak detector 52. Thus, the output of the positive peak detector is sampled in sample and hold circuit 58 during the vertical interval at a time which coincides with the occurrence of the anti-copying waveform.

The output of circuit 58 will be at +0.3 volts in the case of a normal video signal and at about +1.0 volt in the case of a video signal modified or copy-protected as described herein. The output of sample and hold circuit 58 is converted to logic levels as described with reference to the embodiment of FIG. 2 by a differential comparator 44".

Since this third method and embodiment do not rely on the presence of the pseudo-sync pulses, a waveform without them could be used. Such a waveform would be like the top waveform in FIG. 3 with the pseudo-sync pulses removed. The white pulses would then extend from the blanking reference, as indicated by the dashes at that level in the waveform shown.

It can be seen that the outputs of all three embodiments of the disabler illustrated in FIGS. 2, 5 and 6 correspond to those of the waveform shown in FIG. 3 for differential comparator 44. A system is thus described wherein a video signal, modified as shown in U.S. Pat. No. 4,631,603, is positively prohibited from being recorded. By incorporating detection circuitry or disablers in commercial VCRs, particularly in more sophisticated recorders which include dubbing decks, it will be possible for recorded video tape producers to produce copy-protected video signals which may be viewed without impairment on a television receiver but which cannot be copied on the video recorder.

The foregoing describes a method for copy protecting a video signal. With this method, a television receiver produces a normal color picture from the modified signal whereas a video tape recorder having a recording disabling circuit according to the present invention prevents the recording of the modified video signal. Variations of these basic video-signal-modifying waveforms and disabler circuits are possible for practicing the method of this invention. The particular waveforms and circuitry shown are by way of example only. All such modifications and variations which would occur to one of ordinary skill in the art are included within the true spirit and scope of the present invention as is stated more particularly in the claims.

What is claimed is:

1. A method for processing a video signal so as to prevent the making of video tape recordings therefrom, wherein the video signal has a blanking interval which includes a sync pulse and at least one pulse added to the video signal following the sync pulse to produce an added waveform in said blanking interval, said method comprising:
   receiving the video signal with the added waveform in a video signal recording device;
   detecting the presence of the added waveform in the video signal; and
   prohibiting recording of the video signal by the video signal recording device.

2. A method according to claim 1 wherein said prohibiting includes generating a control signal indicating the presence of the added waveform in the received video signal, and disabling the recording device from recording the received video signal when the control signal indicates the presence of the added waveform in the video signal.

3. A method according to claim 2 wherein said generating further includes generating a control signal indicating the absence of the added waveform in the video signal, and enabling the recording device to record the video signal when the control signal indicates the absence of the added waveform in the video signal.

4. A method according to claim 1 wherein said pulse is pseudo-sync pulse.

5. A method according to claim 4 wherein said added waveform includes a positive pulse after each pseudo-sync pulse and within the blanking interval such that the amplitude differential between each pseudo-sync pulse tip and associated positive pulse is different than the normal amplitude differential between the sync pulse tip and the blanking interval following the sync pulse, and said detecting includes detecting the amplitude differential between each pseudo-sync pulse tip and the associated positive pulse.

6. A method according to claim 5 wherein said detecting a voltage differential includes sampling the voltage of the video signal after each pseudo-sync pulse at a time when a corresponding positive pulse is present, and holding the value of the sample for at least a minimum predetermined period of time.

7. A method according to claim 6 wherein the predetermined period of time is at least the duration of a line of the video signal.

8. A method according to claim 6 wherein the predetermined period of time is at least the duration of a field of the video signal.

9. A method according to claim 1 wherein the added waveform includes a plurality of selected pulses following the sync pulse, and said detecting includes generating a signal representative of the frequency of the plurality of selected pulses following the sync pulse.

10. A method according to claim 9 wherein the frequency-representative signal is generated to have a voltage proportional to the selected-pulse frequency.

11. A method according to claim 10 wherein said detecting further includes sampling the frequency-representative signal when it has a voltage proportional to the selected-pulse frequency, and holding the value of the sample for a minimum predetermined period of time.

12. A method according to claim 11 wherein the minimum predetermined period of time is at least equal to the duration of a field of the video signal.

13. A method according to claim 9 wherein said prohibiting further includes generating a control signal indicating the presence of the plurality of selected pulses in the received video signal, and said prohibiting includes prohibiting recording of the received video signal when the control signal indicates the presence of the plurality of the selected pulses in the received video signal.

14. A method according to claim 9 wherein the selected pulses are pseudo-sync pulses following the sync pulse.

15. A method according to claim 1 wherein the waveform includes at least one positive pulse having an amplitude greater than the normal blanking reference level.

16. A method according to claim 15 wherein said detecting includes detecting the peak amplitude of the video signal and sampling the peak-detected signal during the blanking interval.

17. A method according to claim 16 wherein said prohibiting further includes generating a control signal indicating the presence of the positive pulse in the received video signal, and said prohibiting includes prohibiting recording of the received video signal when the control signal indicates the presence of the positive pulse in the received video signal.

18. A tape recorder for prohibiting the recording of a modified video signal on a recording medium, which signal has a blanking interval which includes a sync pulse, comprising:
   input means for receiving a video signal;
   recorder means responsive to a control signal and coupled to said input means for recording video signals on the recording medium; and
   disabling means coupled to said input means and to said recorder means, and responsive to a modified video signal formed by having a selected waveform added to a conventional video signal within its blanking interval, for generating a control signal appropriate for disabling said recorder means from recording the modified video signal.

19. A tape recorder according to claim 18 wherein said disabling means includes means for detecting the presence of the selected waveform in a modified video signal.

20. A tape recorder according to claim 19 usable in a system wherein said selected waveform includes at least one ordered pulse pair, including a pseudo-sync pulse following the sync pulse and a positive pulse following the pseudo-sync pulse, with difference in amplitude between the pseudo-sync pulse tip and positive pulse being different than the normal amplitude difference between the sync pulse tip and the blanking interval following the sync pulse, and said disabling means of said recorder further including means for detecting the amplitude difference between each pseudo-sync pulse tip and the associated positive pulse.

21. A tape recorder according to claim 20 wherein said disabling means further holds a voltage representative of the amplitude difference between each pseudo-sync pulse tip and the associated positive pulse a minimum predetermined period of time.

22. A tape recorder according to claim 21 wherein the minimum predetermined period of time is the duration of one line of the video signal.

23. A tape recorder according to claim 21 wherein the minimum predetermined period of time is at least equal to the duration of a field of the video signal.

24. A tape recorder according to claim 19 usable in a system that includes video signal modifying means which adds a selected waveform includes a plurality of pseudo-sync pulses, and said disabling means of said recorder further including means for detecting the frequency of the plurality of pseudo-sync pulses.

25. A tape recorder according to claim 24 wherein said detecting means further generates a voltage representative of the frequency of the pseudo-sync pulses.

26. A tape recorder according to claim 25 wherein said detecting mean holds the voltage representative of the pseudo-sync pulse frequency a minimum predetermined period of time.

27. A tape recorder according to claim 26 wherein the minimum predetermined period of time is at least equal to the duration of a field of the video signal.

28. A tape recorder according to claim 19 usable in a system wherein the selected waveform includes at least one positive pulse having an amplitude greater than the normal blanking reference level, said disabling means of said recorder further including means for detecting the peak amplitude of the video signal.

29. A tape recorder according to claim 28 wherein said detecting means also samples the peak-detected signal during the blanking interval.

30. A method according to claim 1 wherein said added waveform is selected to assure that if a copy is made of a modified video signal having the same, a generally unacceptable video display will be produced by said modified video signal.

31. A method according to claim 19 wherein said added waveform is selected to cause an automatic gain control system in a videotape recorder to sense an erroneous indication of video signal level and produce a gain correction that results in an unacceptable videotape recording.

32. A tape recorder according to claim 18 wherein said tape recorder includes means which reacts to modified video signal by causing said recorder means to produce a copy of said signal from which a generally unacceptable video display will be provided.

33. A tape recording according to claim 32 wherein said reactive means is an automatic gain control system which will react to said selected waveform by sensing an erroneous indication of video signal level and producing a gain correction that results in an unacceptable videotape recording.

34. In a method for processing a video signal having a blanking interval that has a sync pulse and to which a waveform is added following such sync pulse having at least one pseudo-sync pulse followed by a positive pulse, comprising the step of detecting the amplitude differential between the tip of said pseudo-sync pulse and that of the associated positive pulse.

35. A method according to claim 34 wherein there are a plurality of ordered pairs of pseudo-sync and positive pulses and said detecting includes sampling the voltage of the video signal after each pseudo-sync pulse at a time when a corresponding positive pulse is present, and holding the value of the sample for at least a minimum predetermined period of time.

36. A method according to claim 35 wherein the predetermined period of time is at least the duration of a line of the video signal.

37. A method according to claim 35 wherein the predetermined period of time is at least the duration of a field of the video signal.

38. A method for processing a video signal having a vertical blanking interval that has a sync pulse and to which a waveform is added which includes a plurality of selected pulses following the sync pulse, comprising the step of detecting the presence of said added waveform by generating a signal representative of the frequency of the plurality of selected pulses.

39. A method according to claim 38 wherein the frequency-representative signal is generated to have a voltage proportional to the selected-pulse frequency.

40. A method according to claim 39 wherein said detecting further includes sampling the frequency-representative signal when it has a voltage proportional to the selected-pulse frequency, and holding the value of the sample for a minimum predetermined period of time.

41. A method according to claim 40 wherein the minimum predetermined period of time is at least equal to the duration of a field of the video signal.

42. A method according to claim 38 wherein the selected pulses are pseudo-sync pulses following the sync pulse.

43. A method for processing a video signal having a blanking interval that has a sync pulse and to which a wave form is added following such sync pulse having at least one positive pulse having an amplitude greater than the normal blanking reference level, comprising the steps of detecting the peak amplitude of the video signal and sampling the peak-detected signal during the blanking interval.

44. A tape recorder for processing video signals, each of which has a selected waveform added to a conventional video signal within its blanking interval, which added waveform includes at least one pseudo-sync pulse following the normal sync pulse of the blanking interval and a positive pulse following the pseudo-sync pulse, comprising detecting means for detecting the amplitude difference between the tip of each pseudo-sync pulse and that of the associated positive pulse.

45. A tape recorder according to claim 44 wherein said detecting means further holds a voltage representative of the amplitude difference between each pseudo-sync pulse tip and the associated positive pulse a minimum predetermined period of time.

46. A tape recording according to claim 45 wherein the minimum predetermined period of time is the duration of one line of the video signal.

47. A tape recorder according to claim 45 wherein the minimum predetermined period of time is at least equal to the duration of a field of the video signal.

48. A tape recorder for processing video signals having a selected waveform added to a conventional video signal within its blanking interval, which wave form includes at least a plurality of pseudo-sync pulses following the normal sync pulse of the blanking interval comprising means for detecting the frequency of the video signal caused by said plurality of pseudo-sync pulses.

49. A tape recorder according to claim 48 wherein said detecting means further generates a voltage representative of said frequency.

50. A tape recorder according to claim 49 wherein said detecting means further holds the voltage representative of said frequency a minimum predetermined period of time.

51. A tape recorder according to claim 50 wherein the minimum predetermined period of time is at least equal to the duration of the field of the video signal.

52. A tape recorder for processing video signals having a selected waveform added to a conventional video signal within its blanking interval following a normal sync pulse, which waveform includes at least one positive pulse following said sync pulse, comprising means for detecting the peak amplitude of the video signal, and means for sampling the peak-detected signal during said blanking interval.

* * * * *

UNITED STATES PATENT AND TRADEMARK OFFICE
CERTIFICATE OF CORRECTION

PATENT NO. : 4,907,093  
APPLICATION NO. : 07/264316  
DATED : March 6, 1990  
INVENTOR(S) : John O. Ryan Page 1 of 1

It is certified that error appears in the above-identified patent and that said Letters Patent is hereby corrected as shown below:

In column 7, Claim 31, please delete "A method according to claim 19" and Insert --A method according to claim 1--.

Signed and Sealed this

Twenty-seventh Day of February, 2007

JON W. DUDAS  
*Director of the United States Patent and Trademark Office*